Figure 2:
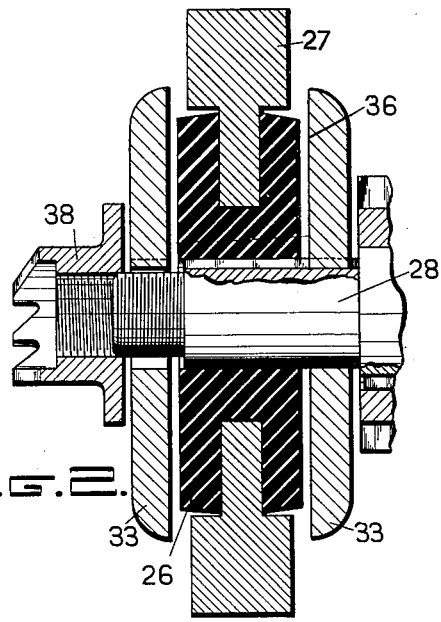

Aug. 29, 1933.   W. R. GRISWOLD   1,925,072
INTERNAL COMBUSTION ENGINE
Original Filed Nov. 16, 1928

Inventor
WALTER R. GRISWOLD.
By Milton Tibbetts
Attorney

Patented Aug. 29, 1933

1,925,072

UNITED STATES PATENT OFFICE 1,925,072

INTERNAL COMBUSTION ENGINE

Walter R. Griswold, Detroit, Mich., assignor to Packard Motor Car Company, Detroit, Mich., a corporation of Michigan Application November 16, 1928, Serial No. 319,794. Renewed October 28, 1931

8 Claims. (Cl. 74—6)

This invention relates to internal combustion engines and particularly to means for controlling torsional vibration in the shafts of such engines.

It has for one of its objects to provide a reliable and effective vibration damper for shafts subjected to such torsional vibration.

Another object of the invention is to provide a vibration damper in which the inertia element is permanently secured on a resilient mounting which forms one of the friction members of the device.

Another object of the invention is to provide a vibration damper in which sticking and binding shall be obviated and in which there shall be no rusting or corroding of the parts and no other improper adherence therebetween.

A further object of the invention is to provide a vibration damper having but few parts of simple construction, which shall be inexpensive to build and easy to operate and maintain.

Figure 1:
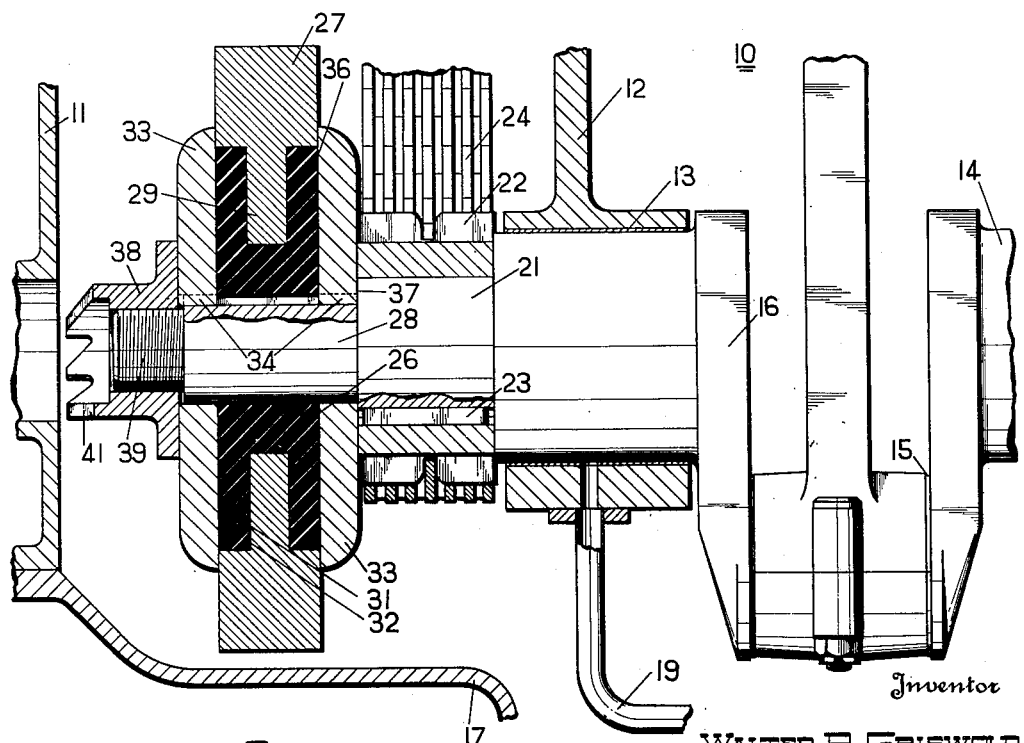

Other objects of the invention will appear from the following description taken in connection with the drawing, which forms a part of this specification, and in which:

Fig. 1 is a vertical longitudinal section through a portion of an internal combustion engine having a vibration damper constructed in accordance with the invention, and Fig. 2 is a similar sectional view showing the parts in partially disassembled position.

Referring to the drawing, at 10 is shown a portion of an internal combustion engine having a crank case 11 provided with transverse webs such as 12, in which suitable aligned bearings 13 are supported. In these bearings is journaled a crank shaft 14, having crank pins 15 and crank cheeks 16, which crank shaft is adapted to be driven by the usual connecting rods from pistons located in the engine cylinders (not shown). The lower part of the crank case is closed by an oil pan 17, removably secured thereto in any suitable manner, thus providing a sump for the lubricating oil of the engine. This oil is circulated to the various engine bearings in any convenient way as by means of pipes such as 19, the overflow returning to the sump.

At the forward end of the engine, in front of the first bearing 13, the crank shaft is reduced in diameter as at 21, and a sprocket gear 22 is mounted thereon and connected by means of a key 23 to rotate with the shaft. This sprocket is adapted to drive a flexible chain 24 by means of which the cam shaft, the generator shaft, and other auxiliaries to the engine proper (not shown) may be driven.

The damping means of this invention is illustrated as mounted at the end of the crank shaft 14 adjacent the sprocket 22, and it consists of a resilient support member or hub 26 on which the weight or inertia member 27 is mounted. The supporting member 26 is preferably formed of rubber and is mounted for movement of an oscillatory or rotative character on a bearing portion 28 at the end of the crank shaft. It is adapted to be permanently secured to the inertia member 27, and in the form illustrated this is accomplished by providing the inertia member with an inwardly disposed radial flange 29, adapted to seat in a peripheral groove 31 in the supporting member 26, and to which it may be vulcanized, or otherwise permanently cemented, on the faces indicated at 32.

The supporting member 26 is adapted for frictional contact with suitable brake or friction members rotatable with the shaft 14, and in the present embodiment of the invention these comprise a pair of axially spaced disks 33, preferably formed of bronze or brass or other non-ferrous metal to which the rubber member 26 will not readily adhere, even when hot, and which are rustless or non-corrodible. These members 33 are keyed to the shaft portion 28 as indicated at 34 to rotate therewith, and they have opposed friction faces 36 adapted to engage the sides of the members 26 and 27. One of the friction members 33 is axially positioned on the shaft by the shoulder 37, formed between the shaft portions 21 and 28, and the other member 33 is retained in its keyed relation on the shaft by a nut 38 on the threaded end 39 of the shaft, which nut clamps the damper assembly against the shoulder 37. The end of the nut 38 is preferably formed with clutch teeth 41 which may be engaged by similar teeth of an endwise movable starter shaft (not shown) for manually rotating the crank shaft for starting.

The rubber supporting member 26, when unconfined, is of greater thickness than the inertia member 27 so that it projects axially beyond the sides of the inertia member as clearly shown in Fig. 2. By screwing up the nut 38 the members 33 are brought axially closer together thus compressing the member 26 between them and the inertia member 27, and clamping the parts upon the crank shaft. Such compression of the member 26 greatly increases the axial pressure between it and the friction member 33 and the damping friction is increased accordingly. Such compression is limited, however, to the thickness of the inertia member, so that by properly choosing the dimensions of this member 27, too much friction, with consequent locking of the damper, is avoided.

The operation of this device will be readily understood. When the shaft is rotating at a uniform velocity, the inertia member 27 and its suporting member 26 will be carried around with the shaft without motion relative thereto. Upon the inception of a torsional vibration, however, an oscillatory movement of high frequency is superposed upon the uniform forward rotary movement of the shaft, which oscillations give to the shaft high accelerations which are alternately positive and negative. Because of its inertia, the weight member 27 cannot readily follow this oscillatory movement but tends to continue its uni-directional rotation about the shaft axis. Consequently an oscillatory movement of the supporting member about the shaft portion 28 occurs, which oscillation is opposed by the braking effect of the friction members 33 on the sides of the supporting member 26. Because of this friction energy is dissipated from the system in the form of heat, thus preventing the increase of the total vibratory energy and damping the vibration in the well known manner.

It will be evident that this construction is free from any difficulty due to sticking or binding of the parts, since the rubber member 26 will have no tendency to vulcanize itself or stick to the bronze or brass disks 33 at any temperatures reached in the operation of the damper. It will further be evident that since the inertia member 27 is permanently secured to its supporting member 26 no difficulties due to the rusting or sticking of these parts together can affect the balance of the damper and its consequent operation.

It will be understood that various forms of the invention other than those described above may be used without departing from the spirit or scope of the invention.

Having thus described the invention, what is claimed and desired to be secured by Letters Patent is:

1. A vibration damper for shafts comprising an inertia member, an annular resilient member permanently secured to the inertia member between said inertia member and the shaft and rotatably mounted on said shaft, and means secured to the shaft frictionally engaging and axially compressing said resilient member.

2. A vibration damper for shafts comprising an annular rubber member journaled on the shaft and having a peripheral groove, an inertia member surrounding said rubber member having a flange permanently secured in said groove, and rustless friction members secured to the shaft and axially compressing said rubber member.

3. A vibration damper for shafts comprising a pair of non-ferrous friction members keyed to the shaft, a rubber supporting member rotatably mounted on the shaft and axially compressed between said friction members to provide damping friction, and an inertia member permanently secured to said supporting member and engaging said friction members to limit compression of the supporting member.

4. A vibration damper for shafts comprising an inertia member, an annular resilient supporting member cemented to the inertia member and rotatable on said shaft, and means including friction disks of a material to which the supporting member is non-adherent secured to the shaft and frictionally engaging said supporting member.

5. A vibration damper for shafts comprising rubber member mounted on said shaft, and an inertia member of less free thickness than said rubber member and surrounding and permanently secured to said rubber member, and friction members fixed on said shaft and contacting the inertia member to axially compress the rubber member in frictional engagement a predetermined amount.

6. A vibration damper for shafts comprising an annular rubber supporting member mounted on the shaft, a pair of friction members of material which is non-adherent to rubber secured to the shaft in frictional engagement with said supporting member, and an inertia member carried by and permanently secured to said supporting member.

7. A vibration damper for shafts comprising a pair of friction members mounted for rotation with the shaft, an annular rubber member compressed by said friction members, and an inertia member carried by said rubber member.

8. A vibration damper for shafts comprising a pair of friction members mounted for rotation with the shaft, an annular rubber supporting member engaged by and interposed between said friction members, means for forcing said friction members together to compress said rubber member, and an inertia member carried by said rubber member.

WALTER R. GRISWOLD.